(12) United States Patent
Hewitt

(10) Patent No.: US 6,799,417 B2
(45) Date of Patent: Oct. 5, 2004

(54) DIVERSION OF COMBUSTION GAS WITHIN A ROCKET ENGINE TO PREHEAT FUEL

(75) Inventor: Ross A. Hewitt, Sacramento, CA (US)

(73) Assignee: Aerojet-General Corporation, Sacramento, CA (US)

(*) Notice: Subject to any disclaimer, the term of this patent is extended or adjusted under 35 U.S.C. 154(b) by 25 days.

(21) Appl. No.: 10/359,434

(22) Filed: Feb. 5, 2003

(65) Prior Publication Data

US 2004/0148923 A1 Aug. 5, 2004

(51) Int. Cl.$^7$ ................................................ F02K 9/64
(52) U.S. Cl. ........................ 60/267; 60/730; 239/127.1
(58) Field of Search .......................... 60/257, 266, 267, 60/730, 736; 239/127.1, 127.3

(56) References Cited

U.S. PATENT DOCUMENTS

| | | | | |
|---|---|---|---|---|
| 2,935,841 A | * | 5/1960 | Myers et al. | 239/127.1 |
| 3,595,025 A | | 7/1971 | Stockel et al. | |
| 3,605,412 A | * | 9/1971 | Stockel | 239/127.3 |
| 3,871,173 A | | 3/1975 | McKenna | |
| 3,910,039 A | * | 10/1975 | Fortini | 239/127.3 |
| 4,369,920 A | | 1/1983 | Schmidt | |
| 4,583,362 A | | 4/1986 | Wagner | |
| 4,703,620 A | | 11/1987 | Niino et al. | |
| 4,765,134 A | | 8/1988 | Brown et al. | |
| 5,353,598 A | | 10/1994 | Huck et al. | |
| 5,387,398 A | | 2/1995 | Mueggenburg et al. | |
| 5,410,874 A | | 5/1995 | Limerick | |
| 5,670,758 A | | 9/1997 | Borchers et al. | |
| 5,737,922 A | * | 4/1998 | Schoenman et al. | 60/752 |
| 5,804,066 A | | 9/1998 | Mueggenburg et al. | |
| 5,832,719 A | | 11/1998 | Riccardi | |
| 6,116,020 A | | 9/2000 | Cornelius | |
| 6,244,041 B1 | | 6/2001 | Vasin et al. | |
| 6,442,931 B1 | | 9/2002 | Vasin et al. | |
| 2002/0104928 A1 | | 8/2002 | Schoonmaker et al. | |

OTHER PUBLICATIONS

Burkhardt, W.M. et al. "Formed platelet liner concept for regenerative cooled chambers," *AIAA 26th Joint Propulsion Conference* Jul. 16–18, 1990/Orlando, FL, pp. 1–5.

Bzibziak, R. "Miniature cold gas thrusters," *AIAA 28th Joint Propulsion Conference and Exhibit* Jul. 6–8, 1992/Nashville, TN, 7 pages total.

Elam, S.K. and Hayes, W.A. "Subscale hot–fire testing of a formed platelet liner," *AIAA 29th Joint Propulsion Conference and Exhibit* Jun. 28–30, 1993/Monterey, CA, pp. 1–9.

Fisher, S.C. "Liquid Propulsion," *Aerospace Amercia* Dec. 2001, pp. 64–65.

Moses, P.L. et al. "An airbreathing launch vehicle design with turbine–based low–speed propulsion and dual mode scramjet high–speed propulsion," *AIAA 9th International Space Planes and Hypersonic Systems and Technologies Conference and 3rd Weakly Ionized Gases Workshop* Nov. 1–5, 1999/Norfolk, VA, pp. 1–21.

Mueggenburg, H.H. et al. "Platelet actively cooled thermal management devices," *AIAA 28th Joint Propulsion Conference and Exhibit,* Jul. 6–8, 1992/Nashville, TN 22 pages total.

* cited by examiner

Primary Examiner—Louis J. Casaregola
(74) Attorney, Agent, or Firm—M. Henry Heines; Townsend and Townsend and Crew, LLP

(57) ABSTRACT

Heat is extracted from the combustion gas in a rocket engine combustion chamber by diverting portions of the gas through channels in the nozzle wall. The channels are layered between channels of coolant, which in expander cycle rocket engines is uncombusted fuel, to achieve intimate heat exchange between the combustion gas and the fuel. The combustion gas channels are relatively short, returning combustion gas thus cooled to the chamber interior. By drawing combustion gas from the chamber interior into the chamber wall, the cooling process no longer relies on the combustion gas boundary layer for heat transfer as in the prior art.

14 Claims, 3 Drawing Sheets

DIVERSION OF COMBUSTION GAS WITHIN A ROCKET ENGINE TO PREHEAT FUEL

BACKGROUND OF THE INVENTION

1. Field of the Invention

This invention resides in the field of combustion systems for liquid-fuel rocket engines, and is specifically concerned with heat exchange structures for expander cycle rocket engines.

2. Description of the Prior Art

Rocket engines such as those used on space missions require both high thrust and a durable construction that can withstand the extreme conditions of temperature and pressure encountered upon takeoff and in flight and that will enable repeated use of the engines in successive firings. Expander cycle rocket engines use regenerative cooling to achieve both high thrust and durability. In the typical expander cycle rocket engine, the internal walls of the combustion chamber and nozzle are cooled by uncombusted fuel fed by a turbopump into a jacket that surrounds the chamber and nozzle. The heated fuel emerging from the jacket is cycled through the turbine side of the turbopump to serve as the driving medium for the pump. The expanded fuel emerging from the turbine side of the pump then passes into the combustion chamber for combustion with oxidizer. The cycle thus cools the combustion chamber while simultaneously converting a portion of the heat generated by the engine to higher flow rates of fuel and oxidizer to, and hence a higher pressure in, the combustion chamber. The remainder of the heat is retained by the fuel as it enters the combustion chamber, thus preheating the fuel.

The amount of power that the turbopump can extract from the expander cycle to generate pressure in the combustion chamber and the amount of preheating of the fuel before it enters the chamber are limited by the amount of energy that can be extracted from the engine through the cooling jacket. The maximum chamber pressure that has been demonstrated by expander cycles of the prior art is thus typically about 500 psia. Attempts to achieve higher pressures have included the use of heat exchange tubing with bumps on the inner and outer tubing surfaces to produce turbulence at these surfaces. This has met with limited success, increasing the heat transfer rate by only 20% to 40%. Much higher rates of heat transfer are needed if the full potential of the expander cycle is to be realized. Other attempts have involved adding chamber length to increase the surface area and residence time in the jacket. This however adds substantially to the weight of the chamber and to the axial dimension of the rocket engine.

The most efficient heat exchange structures are those that provide the most intimate contact between the medium to be cooled and the coolant, i.e., the largest surface area, the thinnest separating walls, and the narrowest flow channels. One type of structure that offers both of these features is a laminated platelet stack formed by the bonding together of very thin sheets of heat-conductive metal, the sheets having been individually etched prior to bonding to form very narrow, and in some cases intricate, flow passages. Platelet stacks such as these have therefore been used as construction panels for coolant jackets, with the coolant flowing through these very narrow passages. Heat transfer efficiency is still limited however by the fact that the heat extracted from the combustion gas in the chamber is drawn only from the boundary layer.

SUMMARY OF THE INVENTION

The present invention resides in a novel rocket nozzle structure that provides increased heat transfer efficiency by using the pressure drop arising from flow through the combustion chamber to divert portions of the combustion gas into channels in the chamber wall where the combustion gas is in intimate heat exchange contact on two sides with the fuel being preheated. The terms "combustion chamber" and "chamber" are used in this specification and the appended claims to denote the portion of the rocket nozzle upstream of the throat.

Heat exchange in the chamber between the combustion gas and the uncombusted fuel in this invention thus occurs by heat fluxes in two opposing directions, rather than limiting the heat transfer to a single direction at the internal surface of the chamber wall. This augmented heat exchange is achieved by layers of internal channels in the chamber wall, the combustion gas channels occupying at least one layer and the uncombusted fuel channels occupying layers positioned immediately adjacent to, and on opposing sides of, each layer of combustion gas channels. (The channels carrying uncombusted fuel are also referred to herein as "coolant channels" due to the cooling effect they have on the chamber.) The innermost layer is thus a layer of coolant channels drawing heat on one side from the boundary layer in the chamber interior and on the other side from the adjacent layer of channels carrying combustion gas that has been diverted from the chamber interior. Likewise, the layer of channels carrying combustion gas that has been diverted from the chamber interior heats both the innermost layer of coolant channels and a layer of coolant channels on the opposite side, i.e, the third layer from the chamber interior. Similar two-directional heat exchange occurs for every layer of channels except the outermost layer that is closest to the outer surface of the chamber wall.

The combustion gas channels are of limited length, drawing combustion gas from and returning it to the chamber interior, each channel aligned generally in the axial direction or in a direction having an axial component. Each channel has two ports opening into the chamber, the two ports being displaced from each other in the direction of flow in the chamber, one port thus being upstream of the other. Because of the pressure gradient that spontaneously occurs in the channel during the flow of the combustion gases, the chamber pressure at the upstream port is higher than the chamber pressure at the downstream port, causing combustion gas to enter the channel at the upstream port, flow through the channel and exit the channel at the downstream port. In preferred embodiments of the invention, the length of each channel is considerably less than the length of the chamber. The combustion gas channels are distributed around the circumference of the nozzle, and increased efficiency is obtained by including two or more rows of combustion gas channels successively positioned axially along the chamber wall. The boundary layer is thus disrupted at each row of ports, allowing each row of channels to draw fresh and relatively hot combustion gas from the chamber interior for heat exchange with the uncombusted fuel in the coolant channels.

The coolant channels are supplied by a source of fresh fuel, which in the case of expander cycle rocket engines is pumped to the coolant channels by the turbopump. The coolant channels preferably extend the full length of the combustion chamber, and discharge into a common line that leads back to the turbine side of the turbopump. The entries to and exits from the coolant channels are preferably arranged such that the flow of uncombusted fuel through the coolant channels is countercurrent to the flow of combustion gas through the chamber and through the combustion gas channels.

These and other features of the invention, as well as various preferred embodiments, are described in greater detail below.

DETAILED DESCRIPTION OF THE INVENTION AND PREFERRED EMBODIMENTS

Figure 1:
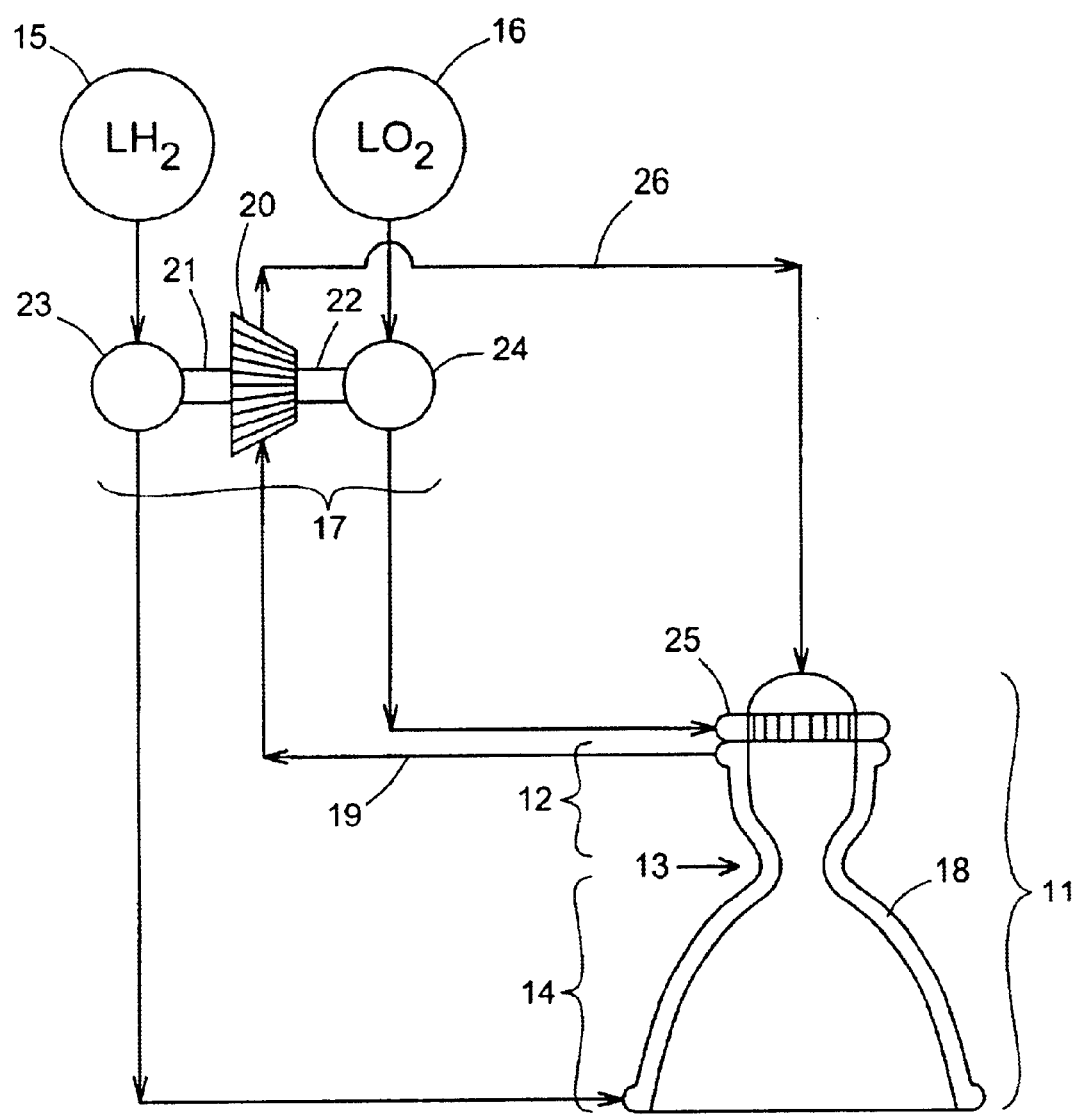
FIG. 1 is a flow diagram of an expander cycle rocket engine that incorporates a heat exchange system of the present invention.

The heat exchange channels in the various embodiments of this invention are arranged in alternating layers with each layer of combustion gas channels residing between two layers of coolant channels. Each such "layer" may consist of two or more sublayers of channels or may be a layer that is only one channel deep. Layers that are one channel deep are preferred. In particularly preferred embodiments, the total number of layers is three, each layer being only one channel deep, the inner and outer layers being coolant channels and the intermediate layer being combustion gas channels.

The chamber wall and channels can be formed by platelet technology to achieve intricate arrays of channels, connecting passageways, and ports, all having very small dimensions. Platelet technology is well known in the art, and a representative description can be found in U.S. Pat. No. 5,387,398 (Mueggenburg et al., issued Feb. 7, 1995) and U.S. Pat. No. 5,804,066 (Mueggenburg et al., issued Sep. 8, 1998), the contents of each of which are incorporated herein by reference in their entirety. As described in these patents, the formation of channels by platelet technology generally begins by applying masks to platelets (thin metallic sheets), either by stencils or by photographic techniques. The platelets are then chemically etched through the masks, and the masks are removed. The platelets are then laminated by either diffusion bonding, roll bonding, brazing, or other conventional techniques for laminating metals. Diffusion bonding is a preferred method for rocket chambers and nozzles and is achieved by hot-pressing the platelets together, using pressures typically in the range of 6.9 to 20.7 MPa (1000 to 3000 psi) and temperatures typically in the range of 450° C. to 550° C. The platelet material can be any heat-conductive material that can be formed into appropriately thin sheets and that can be etched and laminated by any of the methods listed above. Examples of materials that meet this description are copper, steel, and other metals commonly used in the construction of rocket combustion chambers and nozzles. The thickness of each platelet can vary and the exact thickness is not critical to the operation of the engine or to the novelty of this invention. In most cases, platelets having thicknesses less than about 0.025 inch (0.064 cm), or within the range of about 0.001 inch (0.00254 cm) to about 0.025 inch (0.064 cm), will provide the best results in terms of ease of manufacture and the formation of channels of the appropriate dimensions. The total number of platelets in the laminate can vary and will be selected on the basis of the desired heat transfer load, the pressure drop and flow rates through the channels, and other general matters of construction, as well as the ability to withstand the conditions expected to be encountered during use. In most cases, the number of platelets will range from 10 to 2,500, and preferably from 20 to 500.

The size and spacing of the channels is also variable, and will be selected on the basis of the cooling needs of the chamber as governed by its dimensions and operating conditions. In most cases, best results will be obtained with channels having a cross-sectional area of from about 0.001 square inch to about 0.03 square inch (about 0.0065 $cm^2$ to about 0.76 $cm^2$). A presently preferred channel size is 20 mils by 40 mils (0.020 inch by 0.040 inch, or 0.051 cm by 0.102 cm), although channel sizes up to twice these dimensions are contemplated as well. The spacing between channels is preferably approximately equal to the width or the smallest dimension of a single channel.

The orientations of both types of channels will be either axial, i.e., following the direction of the projection of the chamber axis on the wall, or a direction that has an axial component, i.e., straight or curved but at an acute angle to the projection of the chamber axis. The coolant channels are preferably oriented transverse to the combustion gas channels, i.e., crossing the combustion gas channels rather than running parallel to them. With such an orientation, an individual combustion gas channel can be in heat exchange relationship with two or more, and preferably several, coolant channels in succession. Preferred rocket nozzles are those whose wall is symmetrical about a centerline that forms the nozzle axis, and most preferred nozzles are those that have a circular cross section. Preferred combustion chambers (the portion of the nozzle upstream of the throat) are likewise symmetrical about the same centerline with a circular cross section. The coolant channels are preferably spirally oriented, i.e., oriented at an acute angle to the projection of the chamber axis (the centerline) on the chamber wall. Preferred acute angles are from about 15° to about 40°, with about 25° to about 35° particularly preferred. Channels oriented at such angles are described in co-pending U.S. patent application Ser. No. 10/308,645, filed Dec. 2, 2002, entitled "Nozzle With Spiral Internal Cooling Channels" (Ross A. Hewit, inventor), the contents of which are incorporated herein by reference in their entirety. The term "spiral" in this context is intended to mean a three-dimensional curve that curves about an axis, either in a partial turn or in one or more full turns, the axis in this invention being the axis of the chamber and the curve following the wall of the chamber with vector components in both the axial and circumferential directions.

The combustion gas channels are preferably axial and, as noted above, shorter than the coolant channels. The preferred length of a combustion gas channel is from about 2 cm to about 30 cm. In embodiments in which the combustion gas channels are arranged in a series of rows, it is preferred that the inlet ports of any individual row are downstream of the outlet ports of any rows that are positioned upstream of that row. Otherwise stated, the outlet ports of any individual row are preferably positioned upstream of the inlet ports of any successive rows. The number of rows will vary depending on the geometry of the chamber and the amount of heat to be extracted from the combustion gas, although in preferred embodiments, the number of rows will range from 2 to 20.

Combustion chambers to which this invention is applied are preferably the combustion chambers of supersonic rocket nozzles which contain a convergent (subsonic) portion, a throat, and a divergent (supersonic) portion. The convergent portion either serves as the combustion chamber or is located immediately downstream of the combustion chamber. The coolant channels may extend through the entire length of the nozzle, i.e., the convergent portion, throat and divergent portions combined.

While this invention is applicable to rocket engines that are powered by fluid, preferably liquid, fuel and fluid, preferably liquid, oxidizer, the preferred engines are those that utilize liquid hydrogen as the fuel and liquid oxygen as the oxidizer.

As the description above illustrates, this invention is capable of implementation in a variety of ways. A detailed understanding of the invention and its scope can be achieved however by a study of certain specific embodiments. One such embodiment is shown in the drawings and described below.

FIG. 1 is a flow diagram of one example of an expander cycle rocket engine that includes a nozzle whose combustion chamber has a wall structure utilizing the features of the present invention. The nozzle 11 is a supersonic nozzle with a cylindrical and/or convergent section (the combustion chamber) 12, a throat 13, and a divergent section 14. The fuel burning in the combustion chamber is supplied as liquid hydrogen 15 and the oxidizer is supplied as liquid oxygen 16, both of which are fed to the chamber by a single turbopump 17. The hydrogen pumped by the turbopump enters the coolant passages 18 in the nozzle wall, and the hydrogen 19 emerging from the coolant passages drives the drive turbine 20 of the turbopump. The drive turbine 20 drives two shafts 21, 22 that drive separate pumps 23, 24 for the liquid hydrogen and liquid oxygen, respectively. The oxygen pumped by the turbopump enters an inlet torus 25 at the entrance to the combustion chamber 12 of the nozzle. The expanded uncombusted hydrogen 26 emerging from the drive turbine 20 of the turbopump is likewise fed to the injector for the combustion chamber 12.

Figure 2:
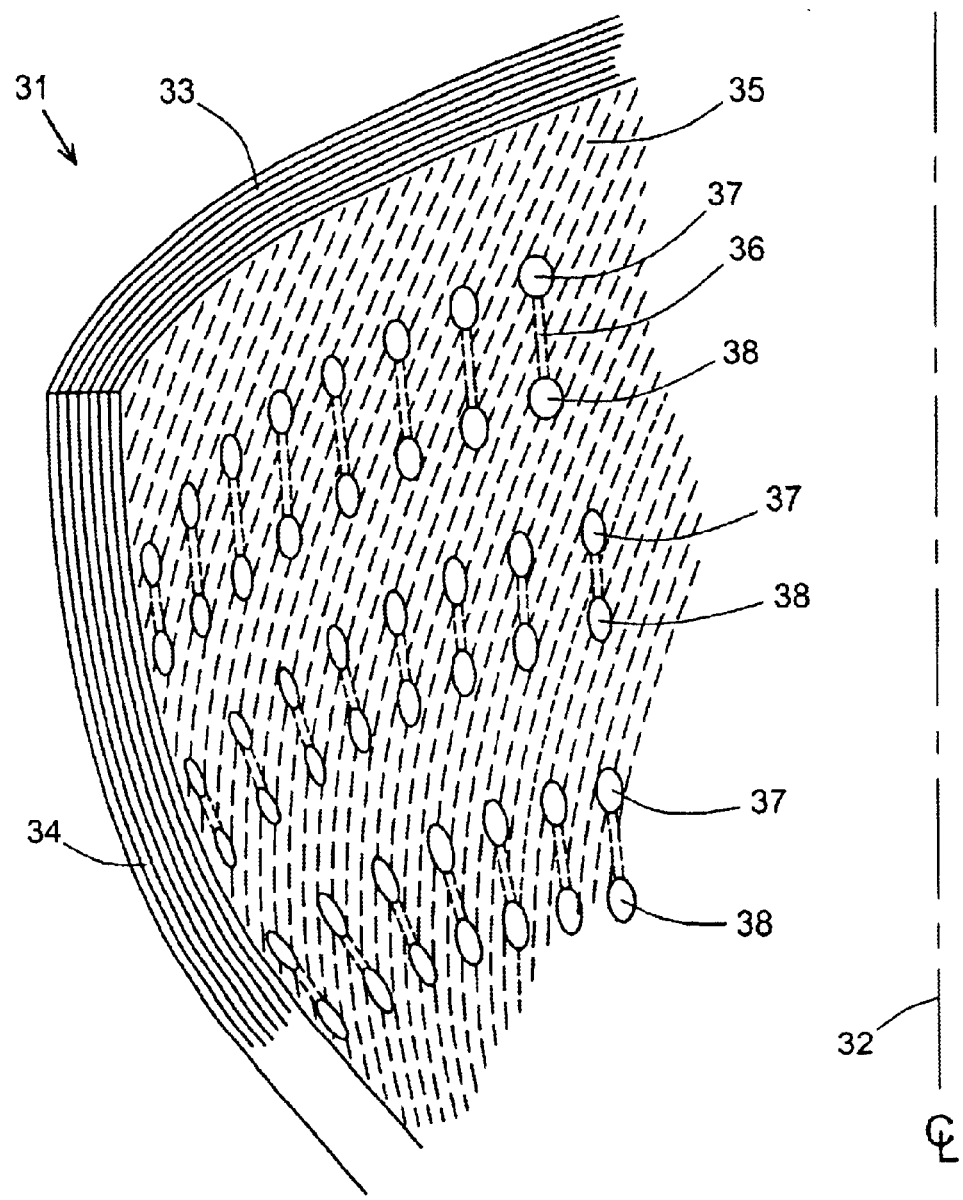
FIG. 2 is an enlarged perspective view of a section of the wall of the combustion chamber 12 of the rocket engine of FIG. 1.

FIG. 2 is an enlarged perspective view of a section of the wall of the combustion chamber 12 of the nozzle of FIG. 1. In this view, the wall itself 31 is shown in both transverse and longitudinal cross section to indicate the curvature of the wall around the chamber axis 32.

Both the transverse and longitudinal cross section surfaces 33, 34, respectively, cut across channels, although the channel cross sections are not shown on these surfaces. The projections of the various channels on the inner surface of the wall are shown in dashed lines. The dashed lines representing the coolant channels 35 are angled relative to the chamber axis 32, following spiral paths along the wall curvature. The dashed lines representing the combustion gas channels 36 are axially oriented, generally parallel to the chamber axis 32 except for the converging contour of the wall.

The combustion gas channels 36 extend only from the inlet ports 37 to the outlet ports 38. Each combustion channel thereby traverses two or more coolant channels. Three rows of combustion gas channels and their associated inlet and outlet ports are shown. This number is merely representative of the possible use of multiple rows of combustion gas channels; the actual number, as explained above, can range from as few as one to a number well in excess of three. The rows can be evenly spaced (as shown) or of different spacing in cases where different spacing between rows might increase the amount of heat extracted from the combustion gas. The rows may be entirely separated from each other as shown, or the out let ports of one row of channels may be at the same level as the inlet ports of the next row, or the channels of adjacent rows may overlap. In the embodiment shown in this Figure, the rows are separated such that the inlet ports 37 of one row are downstream of the outlet ports 38 of the preceding row. As noted above, each row preferably extends around the full circumference of the chamber wall, each row containing equally spaced channels.

Figure 3:
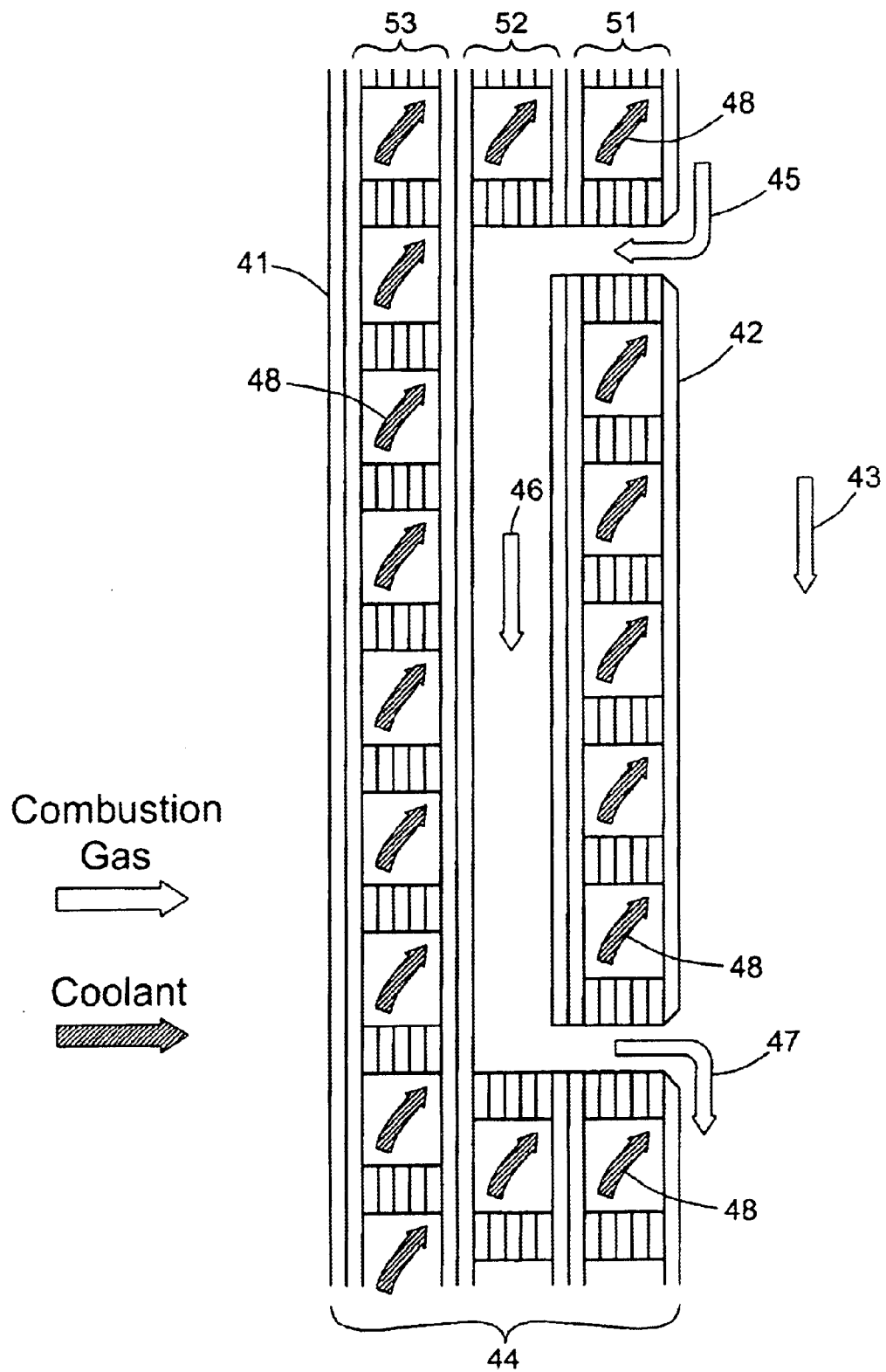
FIG. 3 is a cross section of the wall of the combustion chamber shown in FIG. 2, taken parallel to the combustion chamber axis.

FIG. 3 is an enlargement of the longitudinal cross section 34 of the combustion chamber wall. The outer surface 41 of the wall is at the left and the inner surface 42 facing the combustion gas in the chamber interior is on the right. The bulk combustion gas flow in the chamber interior is shown by the open arrow 43.

The wall is a laminate of platelets 44, and the various channels are formed by aligned openings in the platelets. The open arrows 43, 45, 46, 47 represent the flow of combustion gas, and the filled arrows 48 represent the flow of coolant. The coolant in all of the coolant passages flows upward, countercurrent to the combustion gas, and the coolant flow arrows 48 are shown as curved and angled arrows to indicate that the coolant flow passages are spiral-form passages at an angle to the plane of the Figure and following the curvature of the wall. The combustion gas directions (represented by the open arrows 43, 45, 46, 47) in this cross section are all in the plane of the Figure. The channels in this embodiment are arranged in three layers—an innermost layer 51 of coolant channels, an intermediate layer 52 of combustion gas channels, and an outermost layer 53 of coolant channels. The channels of the intermediate layer 52 (only one such channel is shown) receive the hot input gas from inlet ports 54 and discharge the cooled gas through outlet ports 55.

The foregoing description focuses on particular embodiments of the invention for purposes of explanation and illustration. Further embodiments and modifications of the above will be apparent to those skilled in the art upon reviewing this description, such embodiments and modifications falling within the scope of the invention as defined by the appended claims.

What is claimed is:

1. A rocket engine combustion chamber defined by a chamber wall surrounding a chamber interior, said chamber wall having internal channels arranged in a plurality of layers comprising layers of coolant channels alternating with at least one layer of combustion gas channels, one of said layers of coolant channels forming an innermost layer of said chamber wall, all of said coolant channels being in flow communication with a source of fuel and having an outlet for discharge of heated fuel, and said combustion gas channels having ports opening into said chamber interior, said ports comprising inlet ports and outlet ports downstream of said inlet ports.

2. A rocket engine combustion chamber in accordance with claim 1 in which said plurality of layers consists of said innermost layer of coolant channels, an outer layer of coolant channels, and a layer of combustion gas channels between said innermost and outer layers of coolant channels.

3. A rocket engine combustion chamber in accordance with claim 1 in which said coolant channels, said source of coolant, and said outlet for discharge of heated coolant are arranged for counter-current flow relative to combustion gas flow through said chamber interior.

4. A rocket engine combustion chamber in accordance with claim 1 in which said combustion gas channels are arranged in a plurality of rows axially distributed along said chamber wall.

5. A rocket engine combustion chamber in accordance with claim 4 in which each row comprises inlet ports to draw combustion gas from said chamber interior and outlet ports to return cooled combustion gas to said chamber interior, said outlet ports of individual rows being upstream of said inlet ports of rows positioned successively downstream.

6. A rocket engine combustion chamber in accordance with claim 5 comprising from 2 to 20 of said rows.

7. A rocket engine combustion chamber in accordance with claim 1 in which said chamber wall is symmetrically shaped around a chamber axis, and said coolant channels are arranged in spirals around said chamber axis.

8. A rocket engine combustion chamber in accordance with claim 7 in which said coolant channels form an angle of from about 15° to about 40° relative to a projection of said chamber axis on said chamber wall.

9. A rocket engine combustion chamber in accordance with claim 7 in which said coolant channels form an angle of from about 25° to about 35° relative to a projection of said chamber axis on said chamber wall.

10. A rocket engine combustion chamber in accordance with claim 1 in which said internal channels reside in said convergent section of said chamber wall.

11. A rocket engine combustion chamber in accordance with claim 1 in which said chamber wall is comprised of a laminate of platelets, each platelet less than about 0.064 cm in thickness, with said internal channels defined by elongated etched regions in individual platelets.

12. A rocket engine combustion chamber in accordance with claim 1 in which each said internal channel has a cross section area of from about 0.0065 $cm^2$ to about 0.76 $cm^2$.

13. A rocket engine combustion chamber in accordance with claim 1 in which said coolant channels are oriented in directions transverse to said combustion gas channels.

14. A rocket engine combustion chamber in accordance with claim 1 in which said combustion gas channels are from about 2 cm to about 30 cm in length.

* * * * *